United States Patent [19]
Ledgett

[11] 3,796,873
[45] Mar. 12, 1974

[54] CONTAINER FILL WEIGHT CONTROL USING NUCLEAR RADIATION

[75] Inventor: Lowell A. Ledgett, Ridgewood, N.J.

[73] Assignee: Colgate-Palmolive Company, New York, N.Y.

[22] Filed: May 3, 1971

[21] Appl. No.: 139,897

Related U.S. Application Data

[63] Continuation of Ser. No. 817,048, April 17, 1969, abandoned.

[52] U.S. Cl. .................. 250/357, 222/55, 222/64
[51] Int. Cl. .......................................... G01n 23/10
[58] Field of Search ............ 250/43.5 D, 43.5 FL, 250/43.5 MR; 222/55, 64

[56] References Cited
UNITED STATES PATENTS 3,278,747  10/1966  Ohmart .......................... 250/83.3 D
3,368,593  2/1968  Mamas .......................... 250/43.5 FL
3,412,699  11/1968  Culp et al. ..................... 250/43.5 D Primary Examiner—Archie R. Borchelt
Attorney, Agent, or Firm—Herbert S. Sylvester; Murray M. Grill; Kenneth A. Koch

[57] ABSTRACT

An apparatus for maintaining a desired weight for individual containers including radiation means spaced from a conveyor unit for irradiating filled containers. Suitable detection means are used to actuate a filler corresponding to a signal from an irradiated package and based upon a predetermined standard of absorption, the filling of later packages is controlled.

2 Claims, 4 Drawing Figures

PATENTED MAR 12 1974　　3,796,873

INVENTOR.
LOWELL A. LEDGETT
BY Ronald J. Cornell

CONTAINER FILL WEIGHT CONTROL USING NUCLEAR RADIATION

This application is a continuation of my copending application Ser. No. 817,048, filed on Apr. 17, 1969 now abandoned.

This invention relates to a method and apparatus for automatically delivering to a container moving on a conveyor unit a weight quantity of filler material which does not deviate from a preset standard beyond a narrow permissible range of values. More particularly, the invention relates to a method of indirectly measuring and controlling the mass or weight of container fill material as a function of the amount of nuclear radiation absorbed by the filled container.

For obvious reasons, both the consumer and the packager are concerned with the weight of a container's contents. Considerable amounts of time, money and effort have been spent by packagers developing automatic dispensing machines for filling empty containers with a specified quantity of material. Although the average weight of the contents of a large number of containers will fall within the limits prescribed by Federal and local laws, the statistical sampling must include some filled containers of weights outside these limits.

It is, therefore, the primary object of the present invention to provide an automatic container fill weight control system for use on a conveyor unit which will regulate the quantity of material dispensed into a container to within a narrow range of permissible deviations from a preset standard weight.

It is another object of this invention to provide an automatic container fill weight control system for use on a conveyor unit which system compensates for all extraneous fixed or moving mass surrounding spaced containers on the conveyor so that accurate signals representative of the true variations from and the gross weight of the filled containers will be obtained.

It is a further object of the invention to provide an automatic container fill weight control system for use on a conveyor unit which will dispose of random excessively overweight, underweight or empty containers without adversely affecting the operation of the control system.

Spaced filled containers moving on a conveyor unit can be subjected to a field of nuclear radiation for example, gamma rays, and the amount of radiation absorbed by the package measured as a function of its mass which is translatable into units of weight or mass dependent parameters. A radiation detecting unit can be placed below the containers and parallel to a source of radiation located above the containers so that when an individual container passes through the beam of radiation, the amount of radiation absorbed by the container and its contents will appear as a pulsating electrical output signal on a meter or other means responsive to changes in voltage or current, depending upon the measuring system.

For a given number of filling stations in either an in-line intermittent filler or a continuous rotary filler, the practical rate of delivery for filled containers is higher when each station operates on the basis of preset volume rather than the more time-consuming method using preset weight. To achieve close fill weight control on a volumetric filler without sacrificing rate of fill, the fill weight of each container is monitored and through appropriate control means, the fill volume is adjusted to give the desired statistical percentage of filled containers above the minimum permissible weight. Random excessive over- or underweight containers can be rejected for correction or discard and the effect on overall control can be nullified whether or not the container is accepted or rejected.

Gravimetric check weighers cannot respond fast enough to handle containers at the close spacing and rate at which they are conveyed from filler to closing mechanism. Moreover, for positive handling at high speed, the containers should not be freed of support which would be necessary to obtain an accurate friction-free, weight.

My method and apparatus as described herein for accurately measuring the mass of material placed in successive containers by a dispensing machine engaged in a continuous filling process utilizes a container fill weight measuring unit including a nuclear radiation source, preferably gamma radiation, and a detector which provides an electrical output that can be translated to the average container fill weight. The gamma-ray measuring circuit is interrupted, for example by a shutter device, for the interval of time when a container is not moving through the beam of radiation, thus compensating for the spacing between the containers to give a corrected weight or mass of material moving past a given point per unit of time or true weight or mass flow reading at all times. Also, the electronic measuring circuit is designed to ignore an occasional empty container which passes the source of radiation, conveniently by means of a conventional device such as a photo-electric cell. The electrical signal will actuate a servomechanism that varies the volume of a telescoping filler dispenser flask to correct for deviations from the predetermined range of acceptable values of container fill weight, thus automatically adjusting the telescoping measuring flasks of filler to restore the preset mass or weight dispensed to successive containers.

Still further objects and features of this invention reside in the provision of a weight measuring and control system for spaced filled containers moving on a conveyor belt which is utilizable for containers of any convenient size or shape, which requires a lower cost of installation as compared to other weight check mechanisms because of less space required and the elimination of the need to break the conveyor belt line or other carrier mechanism.

These, together with the various ancillary objects and features of this invention, which will become apparent as the following description proceeds, are attained by this container check weight system, preferred embodiments of which have been illustrated in the accompanying drawings, by way of example only, wherein.

Figure 1:
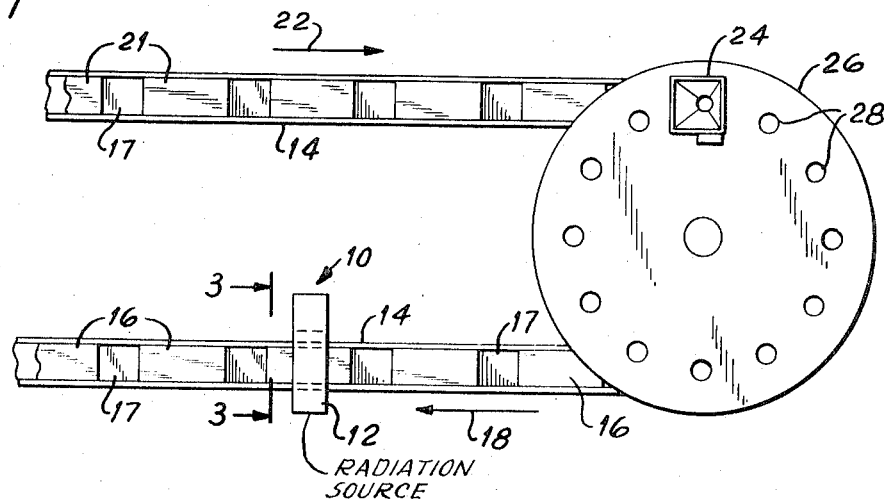
FIG. 1 is a partial top plan view of a conveyor unit and volumetric container filler outfitted with a container fill weight measuring system in accordance with the concepts of the present invention, the arrows indicating the direction of motion of the conveyor belt.
Figure 2:
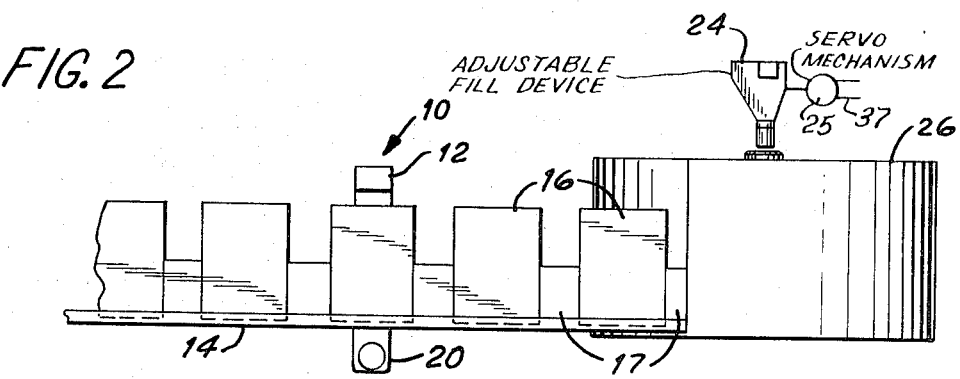
FIG. 2 is a partial side elevational view of the container check weight measuring system of this invention.
Figure 3:
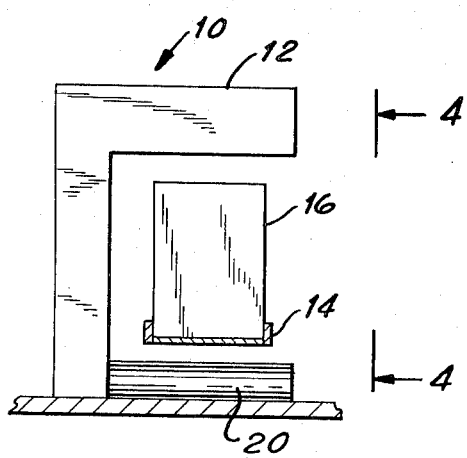
FIG. 3 is an enlarged vertical sectional view of the container fill weight measuring system taken along the plane of line 3—3 in FIG. 1; and, FIG. 4 is an enlarged detail view in section of the container fill weight measuring system taken along the plane of line 4—4 in FIG. 3.
Figure 4:
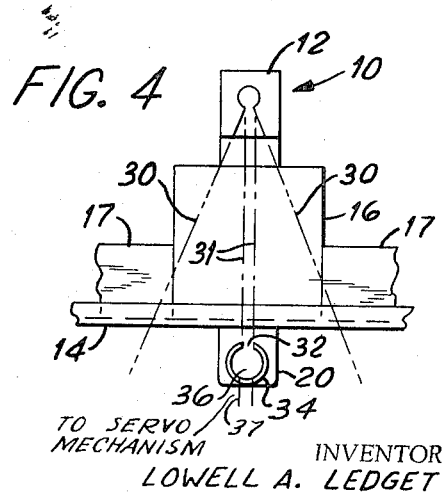

With continuing reference to the accompanying drawings particularly to the embodiment shown in FIGS. 1 and 2, wherein like reference numerals designate similar parts throughout the various views, reference numeral 10 is used to generally designate the radiation source-detector unit of this invention. Source-detector unit 10 is generally C-shaped and comprises a source of nuclear radiation 12 located above the conveyor unit 14, and a radiation detecting device 20, located beneath the conveyor unit 14 and parallel to strip source 12. The conveyor unit 14 carries spaced filled containers or cartons 16, optionally separated by spacer blocks 17, in the direction of arrow 18. Of course, the relative positions of source 12 and detector 20 may be reversed or they may be placed parallel to one another at opposite sides of the area through which the cartons pass. Empty containers 21 travel on the conveyor belt 14 in the direction of arrow 22 towards adjustable fill means in the form of a set of telescoping measuring flasks 24 with gates and level filling means not shown, carried by and located above a revolving dispensing unit 26 driven by a motor, not shown, and having openings 28 therein to facilitate delivery of filler material to an empty container situated beneath opening 28.

In operation, successively spaced empty containers 21 travel on a conveyor belt 14 in the direction of arrow 22. The containers are filled by a quantity or volume of material regulated by telescoping measuring flasks 24. Filled containers leaving dispensing unit 26 pass through a beam of nuclear radiation, preferably gamma radiation, emanating from a radioactive isotope, such as cesium 137, evenly distributed along the entire length of an elongated opening, not shown, in strip source 12, the beam diverging at its source to form an envelope of radiation, generally designated by the dotted lines 30. Although source 12 may be designed in other shapes, the opening must be at least as long as necessary so that no part of the container will miss passing through the radiant beam which reaches the receiver. A certain amount of radiation generated by the source 12 is absorbed by the filled container. It can be shown that the amount of radiation absorbed by the filled container is a function of its mass, or a mass dependent variable such as weight. A portion of the narrow beam of radiation indicated by lines 31 merely passes through container 16 and its contents without being absorbed thereby and impinges upon a restricted opening 32 in lead collimator 34 surrounding radioactivity sensor 36. Thus, sensor 36 senses the portion of radiation energy not absorbed by the filled container and provides a signal representative of a moving average of weights as indicated at 37. Since the total amount of radiation reaching the receiver can be measured without any container (or an empty container) passing through the beam, the amount of radiation absorbed by the material filling the container is readily calculated as the difference. By this means of calibration, the radiation attenuation caused by the contents of the container is determined. Conveyor or carrier parts may be arranged to have constant absorption, to be out of the beam passing through the container, or to be so high in absorption as not to cause significant variation in the radiation received. Sensor 36 thus calibrated measures the amount of radiation absorbed by the container contents, and it translates this value into a pulsating electrical current which is called the mass flow signal. Sensor 36 is also preferably adjusted to measure the average amount of radiation absorbed by a selected number of filled containers, this being interpreted as the average mass of filled container moving per unit length of conveyor belt. The mass flow signal is used through conductors 37 to actuate a servomechanism 25 to adjust the volume of telescoping flasks 24 to correct for variations in units of container fill weight which is a function of depth of fill, carton volume, and product density and to restore the preset mass absorption in terms of weight or volume of filler material being delivered to the containers.

In one embodiment of the invention, in order to correct for the spacing between the containers, the beam of radiation is interrupted during the time interval when a container or carton is not located beneath the source of radiation, for example, the source may be controlled by a shutter device which opens at the leading edge of the carton and closes at the trailing edge as sensed by a photoelectric or microswitch control circuit, or alternatively, blocks between the cartons can fully interrupt the radiation as would the shutter. The circuitry of the container check weight mechanism is designed to ignore an occasional empty container passing through the beam of radiation. It is also contemplated to make corrections to the telescoping flask mechanism based on an average weight signal obtained by integrating the pulse signals for as many filled cartons as are desired in the discrete or, alternatively, moving averages.

In a preferred embodiment, continuous fill weight control is made proportional to the moving average of a selected number of successive cartons. Thus, corrections are based on a mathematical function of the moving average of 5, 10, 15, etc. cartons to give the desired statistical distribution of carton weights. A correction control responsive to an average number of cartons is faster than a stepwise partial correction made after a large step change occurs in filler weight as a result of volume or density change.

The check weight system of this invention may be used to control the fill weight of containers of any size or shape. Continuous filling line operations may be had, for example, with spray products, powders, pastes, solid cakes, and liquids.

A latitude of modification, substitution and change is intended in the foregoing disclosure, and in some instances some features of the invention will be employed without a corresponding use of other features. Accordingly, it is appropriate that the appended claims be construed broadly and in a manner consistent with the spirit and scope of the invention.

I claim:

1. An apparatus for maintaining the weight of material filled into individual containers within a predetermined range, comprising adjustable means to fill material into said containers, means including a conveyor unit to convey filled containers away from said filling means, radiation means above and spaced from said conveyor unit for subjecting said filled containers to a field of nuclear radiation, said radiation means comprising an elongated strip source of nuclear radiation, said strip source extending transversely of said conveyor and including a radioactive isotope and an elongated opening for passage of nuclear radiation from said radioactive isotope, means for detecting the amount of radiation passing through said filled containers and for creating a signal representative of the difference between the radiation absorbed by said filled container and a predetermined standard, said means for detecting the amount of radiation absorbed by a filled container including an elongated sensor means beneath said conveyor unit and parallel to said radiation means whereby radiation passes through the entire mass of fill material during the movement of each filled container across its path so that the signal generated by the detection means is representative of the total weight of material in each filled container, means for forming a signal representative of a moving average of the weights of a predetermined number of filled containers and means for actuating said adjustable filling means in accordance with changes in the signal representative of said moving average to alter the weights of fill material so that they conform to a predetermined standard fill weight.

2. An apparatus according to claim 1, wherein the midpoint of said elongated opening is disposed at the centerline of said strip source, said centerline is located in a vertical plane passing through said conveyor unit perpendicular to said direction of movement of said containers, and said radioactive isotope is evenly distributed along said elongated opening for a length at least as long as the width of the top surface of said container.

* * * * *